US012759914B2

(12) United States Patent
Bergqvist et al.

(10) Patent No.: US 12,759,914 B2
(45) Date of Patent: Oct. 13, 2026

(54) METHOD AND SYSTEM FOR TREATING INDUSTRIAL PROCESS FLUIDS

(71) Applicant: Wallenius Water Innovation AB, Stockholm (SE)

(72) Inventors: Johan Bergqvist, Saltsjo-Boo (SE); Veronica Diesen, Hagersten (SE); Haidong Liao, Taby (SE); Mike De Roos, Stockholm (SE); Henrik Fernstrom, Ingaro (SE)

(73) Assignee: Wallenius Water Innovation AB, Stockholm (SE)

( * ) Notice: Subject to any disclaimer, the term of this patent is extended or adjusted under 35 U.S.C. 154(b) by 418 days.

(21) Appl. No.: 18/552,057

(22) PCT Filed: Mar. 18, 2022

(86) PCT No.: PCT/SE2022/050261
§ 371 (c)(1),
(2) Date: Sep. 22, 2023

(87) PCT Pub. No.: WO2022/203568
PCT Pub. Date: Sep. 29, 2022

(65) Prior Publication Data

US 2024/0166540 A1 May 23, 2024

(30) Foreign Application Priority Data

Mar. 23, 2021 (SE) .................................. 2150334-7

(51) Int. Cl.
*C02F 1/68* (2023.01)
*B08B 9/00* (2006.01)
(Continued)

(52) U.S. Cl.
CPC ................ *C02F 1/686* (2013.01); *B08B 9/00* (2013.01); *C02F 1/008* (2013.01); *C02F 1/325* (2013.01);
(Continued)

(58) Field of Classification Search
None
See application file for complete search history.

(56) References Cited

U.S. PATENT DOCUMENTS 2,893,412 A 7/1959 Fox et al.
3,593,737 A 7/1971 Higgins
(Continued)

FOREIGN PATENT DOCUMENTS

CN 100374189 C 3/2008

OTHER PUBLICATIONS

Extended European Search Report dated Feb. 6, 2025 for corresponding European Application No. 22776223.4.
(Continued)

*Primary Examiner* — Richard C Gurtowski
(74) *Attorney, Agent, or Firm* — Harness, Dickey & Pierce, P.L.C.

(57) ABSTRACT

A method and a fluid treatment system for treating an industrial process fluid used in a system, said method comprising the steps of: transferring a part of the industrial process fluid used in the system through a first fluid path arrangement of a fluid treatment system which is connected to an outlet and an inlet of the system; measuring a concentration of an industrial process fluid concentrate in the industrial process fluid by a sensor device provided in the first fluid path arrangement of the fluid treatment system; adding an amount of this industrial process fluid concentrate to the industrial process fluid used in the system in order to maintain a predefined concentration level, wherein said
(Continued)

amount is calculated based on the measured concentration, whereby the industrial process fluid concentrate is provided into the system via the sensor device in the fluid treatment system; cleaning the sensor device at certain time intervals by providing the industrial process fluid concentrate into the sensor device and keeping the industrial process fluid concentrate in the sensor device for a certain time period.

20 Claims, 9 Drawing Sheets

(51) Int. Cl.

| | |
|---|---|
| ***C02F 1/00*** | (2023.01) |
| ***C02F 1/32*** | (2023.01) |
| ***G05D 11/13*** | (2006.01) |
| *C02F 103/34* | (2006.01) |
| *G02B 27/00* | (2006.01) |

(52) U.S. Cl.

CPC ........ *G05D 11/138* (2013.01); *C02F 2103/34* (2013.01); *G02B 27/0006* (2013.01)

(56) References Cited

U.S. PATENT DOCUMENTS

| | | | | |
|---|---|---|---|---|
| 3,710,811 | A | 1/1973 | Leverenz et al. | |
| 6,396,280 | B1 | 5/2002 | Nonaka et al. | |
| 2017/0008783 | A1 * | 1/2017 | Brown | C02F 1/505 |
| 2017/0281847 | A1 * | 10/2017 | Manda | C02F 1/444 |
| 2021/0294361 | A1 * | 9/2021 | Moses | B01D 35/147 |

OTHER PUBLICATIONS

International Search Report for International Application No. PCT/SE2022/050261 dated Apr. 28, 2022.

Chinese Office Action dated Apr. 21, 2026 for corresponding Chinese Application No. 202280037431.8, and English-language translation of Search Report thereof.

* cited by examiner

METHOD AND SYSTEM FOR TREATING INDUSTRIAL PROCESS FLUIDS

CROSS-REFERENCE TO RELATED APPLICATIONS

This application is a national phase under 35 U.S.C. § 371 of PCT International Application No. PCT/SE2022/050261 which has an International filing date of Mar. 18, 2022, which claims priority to Swedish Application No. 2150334-7, filed Mar. 23, 2021, the entire contents of each of which are hereby incorporated by reference.

TECHNICAL FIELD OF THE INVENTION

The present invention relates to a method for treating industrial process fluids, a fluid treatment system for treating industrial process fluids and a system using an industrial process fluid and comprising a fluid treatment system.

BACKGROUND

Industrial process fluids, such as for example metal working fluids and washing fluids which are used in industrial processes, where metal working fluids can comprise for example cutting fluids, washing fluids and quenching fluids, need to be treated regularly when used in a system. For example, an industrial process fluid concentrate may need to be added to compensate for pull-out (consumption) and water may need to be added to compensate for evaporation that may occur during use of the industrial process fluid in the system. Further treatment of the industrial process fluid may also be needed from time to time such as a purification treatment.

For measuring a concentration of an industrial process fluid concentrate in an industrial process fluid some kind of sensor is needed. For example, a refractometer may be used which optically measures the fluids refractive index. There are problems related to using sensors in industrial process fluids. Any sensor that is continuously in contact with the industrial process fluid will usually get contaminated due to the fact that industrial process fluids may be heavily contaminated, which often is the case in for example both metal working fluids and washing fluids. The contamination may cause the sensor to show an incorrect value. The sensors may need to be cleaned and calibrated from time to time to work correctly.

SUMMARY

An object of the invention is to provide an improved method and system for treating industrial process fluids.

A further object of the invention is to provide an improved method and system for controlling a concentration of an industrial process fluid concentrate in an industrial process fluid.

This is achieved in a method, a fluid treatment system and a system using industrial process fluid according to the independent claims.

According to one aspect of the invention a method for treating an industrial process fluid used in a system is provided. Said method comprises the steps of:

- transferring a part of the industrial process fluid used in the system through a first fluid path arrangement of a fluid treatment system which is connected to an outlet and an inlet of the system;

- measuring a concentration of an industrial process fluid concentrate in the industrial process fluid by a sensor device provided in the first fluid path arrangement of the fluid treatment system;
- adding an amount of this industrial process fluid concentrate to the industrial process fluid used in the system in order to maintain a predefined concentration level, wherein said amount is calculated based on the measured concentration, whereby the industrial process fluid concentrate is provided into the system via the sensor device in the fluid treatment system;
- cleaning the sensor device at certain time intervals by providing the industrial process fluid concentrate into the sensor device and keeping the industrial process fluid concentrate in the sensor device for a certain time period.

According to another aspect of the invention a fluid treatment system for treating an industrial process fluid used in a system to which the fluid treatment system can be connected is provided. Said fluid treatment system comprises:

- a first fluid connector configured to be connected to an outlet provided in the system, said first fluid connector being configured for receiving industrial process fluid into the fluid treatment system;
- a second fluid connector configured to be connected to an inlet provided in the system for returning industrial process fluid after treatment in the fluid treatment system;
- a first fluid path arrangement which is fluidly connecting the first fluid connector and the second fluid connector, wherein said first fluid path arrangement comprises:
  - a first pump configured to pump industrial process fluid from the first fluid connector to the second fluid connector; and
  - a sensor device which is connected in the first fluid path arrangement such that it receives at least a part of the industrial process fluid pumped by the first pump, wherein said sensor device is configured for measuring a concentration of an industrial process fluid concentrate in the industrial process fluid; and
- a second fluid path arrangement which is provided in connection with an inlet of the sensor device, wherein said second fluid path arrangement comprises:
  - a third fluid connector configured to be connected to an industrial process fluid concentrate tank,
- whereby an industrial process fluid concentrate can be provided by the fluid treatment system from a connected industrial process fluid concentrate tank via the second fluid path arrangement and via the sensor device in the first fluid path arrangement and further via the first fluid path arrangement to the second fluid connector for addition to the industrial process fluid used in a connected system
- wherein said fluid treatment system further comprises a control system, whereby the control system is configured to control the fluid treatment system to add an amount of industrial process fluid concentrate via the second fluid path arrangement and via the sensor device to the connected system in order to maintain a predefined concentration level, wherein said amount is calculated based on the concentration measured in the sensor device,
- wherein the control system is configured to control the fluid treatment system for cleaning the sensor device at certain time intervals by letting industrial process fluid concentrate pass into the sensor device and keeping the industrial process fluid concentrate in the sensor device for a certain time period.

According to another aspect of the invention a system using industrial process fluid is provided, wherein said system comprises a fluid treatment system as defined above, wherein said fluid treatment system is connected to an outlet and an inlet provided in the system.

Hereby, by providing the sensor device in a fluid path external to the system where the industrial process fluid is used, the sensor device need not be immersed in industrial process fluid all the time and can hereby be kept clean and less affected by the industrial process fluid and hereby give correct measuring results for a longer time compared to if the sensor device was positioned in industrial process fluid all the time. Furthermore, according to the invention a step of adding new industrial process fluid concentrate in dependence of the measured concentration is provided and this addition of concentrate is according to the invention provided via the sensor device. Hereby the sensor device will be immersed in clean industrial process fluid concentrate regularly which will serve as a cleaning of the sensor. Hereby, there is no need for a stop in the process for the cleaning of the sensor. Hereby an effective and reliable method and system is achieved for treating industrial process fluid where a sensor device can be used reliably for a long time and provide correct sensor output.

One or more valves provided in the system needs to be controlled by a control system for transferring industrial process fluid concentrate into the sensor device and for keeping the industrial process fluid concentrate in the sensor device for a certain time period for performing the cleaning. By keeping the sensor device immersed in industrial process fluid concentrate for a certain time period the sensor device will be effectively cleaned.

In some embodiments of the invention said sensor device comprises a refractometer. Also other sensors can be provided in the sensor device such as a pH sensor and/or a conductivity sensor.

In some embodiments of the invention the step of transferring a part of an industrial process fluid provided in the system through a first fluid path arrangement of a fluid treatment system comprises dividing a flow of the industrial process fluid when passing through the first fluid path arrangement of the fluid treatment system into at least a main fluid path and a return loop fluid path, wherein said main fluid path comprises a first pump and said return loop fluid path either comprises the sensor device or is connected to a possible separate sensor device fluid path of the first fluid path arrangement, wherein said sensor device fluid path comprises the sensor device, wherein said return loop fluid path is connected to the main fluid path such that a part of the fluid flow in the main fluid path can be returned over the first pump via the return loop fluid path and wherein a fluid flow through said return loop fluid path is driven by a differential pressure over the first pump. Hereby a large mixing flow can be provided through the main fluid path all the time or often and a fluid flow through the sensor device is only needed occasionally, for measuring a concentration of the industrial process fluid concentrate in the industrial process fluid and for addition of industrial process fluid concentrate and possibly for addition of water. Hereby the sensor device and other sensitive components such as the valves will not be exposed to the harsh industrial process fluid more than necessary and this will prolong their lifetime and reliability. Furthermore, a good mixing of industrial process fluid can still be performed in the fluid treatment system at all time via the main fluid path and the first pump.

In some embodiments of the invention the step of measuring a concentration of an industrial process fluid concentrate in the industrial process fluid and the step of adding an amount of this industrial process fluid concentrate to the industrial process fluid used in the system comprises sucking industrial process fluid and industrial process fluid concentrate respectively through the sensor device by an ejector pump which is driven by the first pump in the main fluid path and connected to an outlet of the sensor device. By using an ejector pump no further pump is needed in the system, i.e. no separate pump is needed for pumping the industrial process fluid concentrate from the industrial process fluid concentrate tank. This is suitable because the industrial process fluid concentrate may have high viscosity and a chemically aggressive nature that may damage other types of pumps. An ejector pump on the other hand is not that sensitive. Also an ejector pump can handle unlimited dry running without taking damage. This may occur when the industrial process fluid concentrate tank is empty. The ejector pump does not require a separate power supply since it is driven by the first pump which is suitable. This is suitable for the cleaning process of the sensor device and is described in more detail in the detailed description.

In some embodiments of the invention the method further comprises the step of adding water to the industrial process fluid in the system, whereby the adding of water is provided via the sensor device. Hereby the sensor device can be stored in water between uses which is suitable for preserving of sensor functions and prolong a lifetime of the sensor device. Furthermore, the sensor device can be calibrated by use of the water at certain time intervals by use of the water passing the sensor device on its way into the system.

In some embodiments of the invention the method comprises mixing the industrial process fluid used in the system by pumping the industrial process fluid via the fluid treatment system. Furthermore, the added industrial process fluid concentrate can be effectively mixed into the industrial process fluid in the main fluid path and in the first pump. This is important for effective use of the industrial process fluid in the system.

In some embodiments of the invention the method further comprises the step of irradiating the industrial process fluid by UV light in a UV reactor provided in the fluid treatment system, whereby the method further comprises the step of pumping the industrial process fluid through the reactor by the first pump. Hereby the industrial process fluid can also be treated by UV and bacteria can be destroyed. Bacteria in an industrial process fluid can be problematic in many applications. In the embodiments of the invention where a UV reactor is provided the pump used for pumping the industrial process fluid through the UV reactor is also used for mixing of the industrial process fluid concentrate into the industrial process fluid. Hereby a combined effect is provided where both mixing, addition of industrial process fluid concentrate and UV treatment is performed effectively.

In some embodiments of the invention said industrial process fluid is a metal working fluid. The industrial process fluid may also be for example a washing fluid.

Further embodiments of the invention are described in the detailed description and in the dependent claims.

BRIEF DESCRIPTION OF THE DRAWINGS

FIG. 1*b* has an added feature of a water supply connection.

FIG. 2*b* has an added feature of a water supply connection.

FIG. 3*b* has an added feature of a water supply connection.

FIG. 4*b* has an added feature of a water supply connection.

FIG. 5*b* has an added feature of a water supply connection.

FIG. 8*b* has an added feature of a water supply connection.

DETAILED DESCRIPTION OF EMBODIMENTS

Figure 1A:
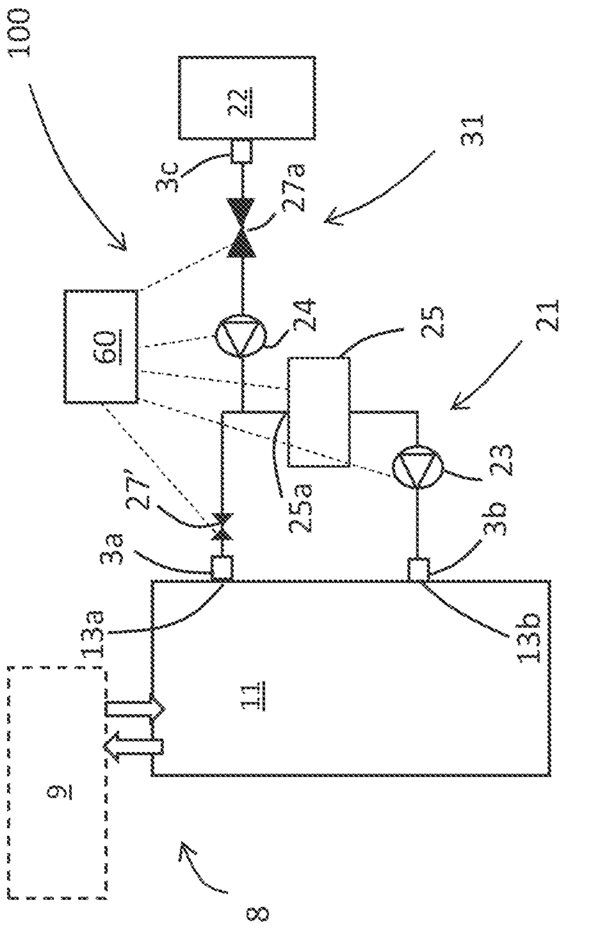
FIGS. 1*a* and 1*b* show schematically two different variations of a fluid treatment system according to one embodiment of the invention.

The present invention relates to the treatment of industrial process fluids. Industrial process fluids can be for example metal working fluids or washing fluids which are used in industrial processes. Washing fluids may be used in different stages of many different industrial processes such as for example washing of materials or components or washing of manufacturing equipment. Metal working fluids can comprise for example cutting fluids, washing fluids and quenching fluids which are used in metal working industry. The present invention may be especially effective for treating industrial process fluids comprising an oil emulsion. Measuring concentrations in oil emulsions can be problematic due to the way refractometers interact with the droplet sizes in emulsions. Measuring emulsions correctly requires the sensor to be very clean. Hereby the present invention can be especially suitable for these types of industrial process fluids which will be discussed in more detail below. Said industrial process fluids are used in different types of systems. Often said systems comprise an industrial process fluid tank where the industrial process fluid is collected. The industrial process fluid needs to be treated at regular time intervals. For example, an industrial process fluid concentrate may need to be added if a concentration of the industrial process fluid concentrate in the industrial process fluid has decreased during use of the industrial process fluid in the system. Furthermore, water may need to be added because of vaporisation of water from the industrial process fluid during use in the system and still further it may be necessary to purify the industrial process fluid from bacteria, particles or other contaminants.

According to the present invention a method for treating industrial process fluids and a fluid treatment system for treating industrial process fluids used in a system are provided. The method and the fluid treatment system are described together with reference to the different embodiments of the fluid treatment system which are shown in FIGS. 1-8. FIG. 9 shows a flow chart of a method according to one embodiment of the invention. Some of the details in the different embodiments of fluid treatment systems in FIGS. 1-8 are the same or similar and are therefore given the same or similar reference numbers. First a more general description of the invention is given with reference to all the drawings and then each embodiment will be described in more detail with reference to respective drawing.

According to the invention a fluid treatment system 100; 100'; 200; 200'; 300; 300'; 400; 400'; 500; 500'; 600; 700; 800; 800' for treating an industrial process fluid used in a system 8 to which the fluid treatment system can be connected is provided. The system can for example be any type of machine or other industrial equipment that uses industrial process fluid. The system 8 comprises often an industrial process fluid tank 11 which is a tank where the industrial process fluid is collected when it is not in use in the system. The fluid treatment system 100; 100'; 200; 200'; 300; 300'; 400; 400'; 500; 500'; 600; 700; 800; 800' according to the invention is configured to be connected to such a system 8 which is using industrial process fluid. If an industrial process fluid tank 11 is provided in the system 8 the fluid treatment system can be connected to the industrial process fluid tank 11 but it can also be connected at other positions in the system. The fluid treatment system comprises hereby a first fluid connector 3*a* configured to be connected to an outlet 13*a* provided in the system 8. The outlet 13*a* can for example be provided in an industrial process fluid tank 11 of the system 8. The first fluid connector 3*a* is configured for receiving industrial process fluid into the fluid treatment system. The fluid treatment system comprises further a second fluid connector 3*b* configured to be connected to an inlet 13*b* provided in the system 8 for returning industrial process fluid after treatment in the fluid treatment system. The inlet 13*b* can for example be provided in an industrial process fluid tank 11 of the system 8. The fluid treatment system comprises furthermore a first fluid path arrangement 21 which is fluidly connecting the first fluid connector 3*a* and the second fluid connector 3*b*. The first fluid path arrangement 21 comprises a first pump 23 configured to pump industrial process fluid from the first fluid connector 3*a* to the second fluid connector 3*b* and a sensor device 25 which is connected in the first fluid path arrangement 21 such that it receives at least a part of the industrial process fluid pumped by the first pump 23, wherein said sensor device 25 is configured for measuring a concentration of an industrial process fluid concentrate in the industrial process fluid. The industrial process fluid concentrate can for example be a metal working fluid concentrate in the example of metal working fluid as industrial process fluid or a washing fluid concentrate in the example of a washing fluid as the industrial process fluid. The sensor device comprises for example a refractometer which is a sensor which measures a refractive index of a fluid and can for example be used for measuring a concentration of a content in a fluid. The sensor device 25 can also in some embodiments of the invention comprise other types of sensors, such as a pH sensor and/or a conductivity sensor.

The fluid treatment system comprises furthermore a second fluid path arrangement 31 which is provided in connection with an inlet 25*a* of the sensor device 25. The second fluid path arrangement 31 comprises a third fluid connector 3*c* configured to be connected to an industrial process fluid concentrate tank 22. The second fluid path arrangement 31 comprises also in some embodiments a valve, here called a concentrate valve 27*a*.

With this fluid treatment system 100; 100'; 200; 200'; 300; 300'; 400; 400'; 500; 500'; 600; 700; 800; 800' an industrial process fluid concentrate can be provided by the fluid treatment system from a connected industrial process fluid concentrate tank 22, first via the second fluid path arrangement 31 and then via the sensor device 25 in the first fluid path arrangement 21 and further via the first fluid path arrangement 21 to the second fluid connector 3*b* for further being transferred into a connected system 8. By providing industrial process fluid concentrate to the system 8 via the sensor device 25 the sensor device will be regularly immersed in clean industrial process fluid concentrate which is suitable because it serves as a cleaning of the sensor device 25. Furthermore, by positioning the sensor device 25 in an external fluid path outside the system 8 the sensor device 25 will not be immersed in the industrial process fluid all the time which will prolong a lifetime for the sensor device because the industrial process fluid is often very contaminated and harsh for the sensor device. Contaminants can attach to the sensor device, for example a refractometer, and disturb refractive reading. Hereby measurement reliability and a sensor lifetime can be improved by this invention. Even further the sensor device 25 itself can be used as an indicator for the presence of an industrial process fluid concentrate in the industrial process fluid concentrate tank 22. A reading from the sensor device 25 can indicate if the flow of industrial process fluid concentrate has stopped due to the industrial process fluid concentrate tank 22 being empty. And even further the added industrial process fluid concentrate can be effectively mixed into the industrial process fluid in the first fluid path arrangement 21 of the fluid treatment system. The industrial process fluid concentrate and the circulated industrial process fluid from the system 8 will be effectively mixed in the first pump 23 and possibly no other mixing device needs to be provided to for example an industrial process fluid tank 11 of the system 8 for mixing of the industrial process fluid.

With reference to all the drawings and specifically to FIG. 9, a method according to the invention for treating an industrial process fluid which is used in a system 8 is described. The method comprises the steps of:

S1: Transferring a part of an industrial process fluid used in the system 8 through a first fluid path arrangement 21 of a fluid treatment system 100; 100'; 200; 200'; 300; 300'; 400; 400'; 500; 500'; 600; 700; 800; 800' connected to an outlet 13*a* and an inlet 13*b* of the system 8. The industrial process fluid will be circulated through the first fluid path arrangement 21 of the fluid treatment system and received into the fluid treatment system from the outlet 13*a* of the system 8 (possibly provided in an industrial process fluid tank 11 of the system 8) and returned to the system 8 (possibly an industrial process fluid tank 11 of the system 8) via the inlet 13*b*.

S2: Measuring a concentration of an industrial process fluid concentrate in the industrial process fluid by a sensor device 25 provided in the first fluid path arrangement 21 of the fluid treatment system 100; 100'; 200; 200'; 300; 300'; 400; 400'; 500; 500'; 600; 700; 800; 800'.

S3: Adding an amount of this industrial process fluid concentrate to the industrial process fluid used in the system 8 in order to maintain a predefined concentration level, wherein said amount is calculated partly based on the measured concentration, whereby the industrial process fluid concentrate is provided into the system 8 via the sensor device 25 in the fluid treatment system.

The amount of industrial process fluid concentrate to add is calculated based on also other factors such as a total volume of industrial process fluid in the system 8. An amount of added industrial process fluid concentrate can in some embodiments of the invention be controlled by use of a flow sensor measuring the flow of an industrial process fluid concentrate into the fluid treatment system and in other embodiments of the invention a time period for opening a valve and allowing an industrial process fluid concentrate from an industrial process fluid concentrate tank 22 to pass into the fluid treatment system can be calculated based on a pump effect and a viscosity of the industrial process fluid concentrate.

In some embodiments of the invention the method further comprises a step of:

S4: Cleaning the sensor device 25 at certain time intervals by providing the industrial process fluid concentrate into the sensor device 25 and keeping the industrial process fluid concentrate in the sensor device for a certain time period. The industrial process fluid concentrate will have a cleaning effect on the sensor device which can be utilised in this method and system according to the invention where the industrial process fluid concentrate is added via the sensor device and then into the system 8.

In some embodiments of the invention, which will be described in further detail below with reference to FIG. 2-8, the step of transferring, S1, a part of an industrial process fluid provided in the system 8 through a first fluid path arrangement 21 of a fluid treatment system further comprises dividing a flow of the industrial process fluid when passing through the first fluid path arrangement 21 of the fluid treatment system 200; 200'; 300; 300'; 400; 400'; 500; 500'; 600; 700; 800; 800' into at least a main fluid path 21*a* and a return loop fluid path 21*b*. The main fluid path 21*a* comprises the first pump 23. The return loop fluid path 21*b* either comprises the sensor device 25 or is connected to a possible separate sensor device fluid path 21*c* of the first fluid path arrangement 21, wherein said sensor device fluid path 21*c* comprises the sensor device 25. In the embodiments shown in FIGS. 2, 3, 6 and 7 the sensor device 25 is provided in the return loop fluid path 21*b* and in the embodiments shown in FIGS. 4, 5 and 8 the sensor device 25 is provided in a separate sensor device fluid path 21*c*. The return loop fluid path 21*b* is connected to the main fluid path 21*a* such that a part of the fluid flow in the main fluid path 21*a* can be returned over the first pump 23 via the return loop fluid path 21*b* and wherein a fluid flow through said return loop fluid path 21*b* is driven by a differential pressure over the first pump 23. Hereby there is no need for an extra pump for dividing a part of the flow into the return loop fluid path 21*b* and furthermore it will be possible to use the first pump 23 as a mixing pump and use the main fluid path 21*a* as a mixing flow for mixing of the industrial process fluid. I.e., a comparatively large flow of industrial process fluid can be provided through the main fluid path 21*a*. This flow can be provided often or all the time. Only a small part of the fluid flow is transferred through the sensor device in the return loop fluid path 21*b* or possibly the sensor device fluid path 21*c* which will be described in further detail below. The fluid flow through the return loop fluid path 21*b* can be provided only occasionally, i.e. only when measurement of the concentration of the industrial process fluid concentrate is needed and when an industrial process fluid concentrate or water is to be added. The rest of the time the sensor device 25 can be stored in industrial process fluid concentrate or water as will be further described below. Hereby contamination of the sensor device from the industrial process fluid can be kept as small as possible and hereby the sensor device can provide accurate measuring for a longer time as discussed above. Furthermore, a larger flow provided through the main fluid path 21*a* for mixing is suitable for mixing of the added industrial process fluid concentrate into the flow of industrial process fluid in the main fluid path 21*a* before it is transferred back to the system 8. If an industrial process fluid tank 11 is provided in the system 8 a mixing of the industrial process fluid in the industrial process fluid tank 11 can be effectively performed by the fluid treatment system according to the invention.

In some embodiments of the invention the method further comprises the step of:

S5: Adding water to the industrial process fluid in the system 8, whereby the adding of water is provided via the sensor device 25. Fluid treatment systems 100', 200', 300', 400', 500', 600, 700, 800' which are adapted for water addition are shown in FIGS. 1*b*, 2*b*, 3*b*, 4*b*, 5*b*, 6, 7 and 8*b*. The fluid treatment system comprises in these embodiments a third fluid path arrangement 41 which is provided in connection with an inlet 25*a* of the sensor device 25, wherein said third fluid path arrangement 41 comprises a fourth fluid connector 3*d* configured to be connected to a water supply, whereby adding of water can be provided via the sensor device 25. The addition of water may be necessary if water is vaporised during use of the industrial process fluid in the system. A level sensor 12 can be provided in an industrial process fluid tank 11 of the system 8 if an industrial process fluid tank 11 is provided. The level sensor 12 can indicate if the amount of industrial process fluid in the system has decreased and water needs to be added. By providing water via the sensor device 25 the sensor device can be easily calibrated at regularly intervals by use of the water. Hereby the method according to some embodiments of the invention further comprises the step of:

S6: Calibrating the sensor device at certain time intervals by use of the water passing the sensor device on its way into the industrial process fluid tank.

In these fluid treatment systems 100', 200', 300', 400', 500', 600, 700, 800' according to the invention where water can be added via the sensor device 25, the sensor device 25 can also be stored in water between the measurements. This is suitable because water will not affect the sensor device negatively and the sensor device will be usable for a longer time. A further advantage with providing water and industrial process fluid concentrate into the system 8 via the sensor device 25 is that the sensor device 25 can be used for registering an outage of industrial process fluid concentrate or water or a stop in the system. The output from the sensor device 25 will clearly indicate if there is water, industrial process fluid or industrial process fluid concentrate in the sensor device 25 and hereby a non-expected output from the sensor device would indicate a stop in the system or that there is no industrial process fluid concentrate left in the industrial process fluid concentrate tank 22. Hereby a user of the system can get an alert when the industrial process fluid concentrate tank 22 is empty and/or when there is a stop in the water supply.

In some embodiments of the invention the method further comprises the step of:

S7: Irradiating the industrial process fluid by UV light in a UV reactor 61 which in some embodiments of the invention is provided in the fluid treatment system 500; 500'; 600; 700; 800;800'. Such fluid treatment systems which comprise a UV reactor 61 are shown in FIGS. 5-8. The industrial process fluid is in these embodiments pumped through the reactor 61 by the first pump 23. The UV irradiation will destroy bacteria in the industrial process fluid effectively.

The different embodiments as shown in FIGS. 1-8 are now described in order below with some more details. Many of the details are relevant for more than one of the embodiments and will not be described for each of the embodiments.

FIG. 1*a* shows schematically a fluid treatment system 100 according to one embodiment of the invention which is connected to a system 8 which is using an industrial process fluid. In this example the system 8 comprises a working part 9 and an industrial process fluid tank 11 in which the industrial process fluid is collected. The fluid treatment system 100 according to the invention is in this example connected to the industrial process fluid tank 11 but could alternatively be connected at another position in the system 8. This will be the same for all embodiments described below with reference to FIGS. 1-8 but will not be repeated again. The fluid treatment system 100 according to the invention is also connected to an industrial process fluid concentrate tank 22. The fluid treatment system 100 comprises a first fluid connector 3*a* configured to be connected to an outlet 13*a* provided in the system 8. In this example the outlet 13*a* is provided in the industrial process fluid tank 11 of the system 8. The first fluid connector 3*a* is configured for receiving industrial process fluid from the system 8 into the fluid treatment system. The fluid treatment system 100 comprises further a second fluid connector 3*b* configured to be connected to an inlet 13*b* provided in the system 8 for returning industrial process fluid after treatment in the fluid treatment system. In this embodiment the inlet 13*b* is provided in the industrial process fluid tank 11 of the system 8. The fluid treatment system 100 comprises further a first fluid path arrangement 21 which is fluidly connecting the first fluid connector 3*a* and the second fluid connector 3*b*, wherein said first fluid path arrangement 21 comprises a first pump 23 configured to pump industrial process fluid from the first fluid connector 3*a* to the second fluid connector 3*b*. So far, all the details described for the embodiment as shown in FIG. 1*a* are the same for all the embodiments and these details will not be described again below where all the other embodiments are described. However, as described above the fluid treatment system does not necessarily need to be connected to an industrial process fluid tank 11 but can instead be connected to another part of the system 8. This is applicable to all embodiments of the invention.

The first fluid path arrangement 21 comprises furthermore a sensor device 25 which in this embodiment is connected in the first fluid path arrangement 21 such that the industrial process fluid pumped by the first pump 23 will pass the sensor device 25. The sensor device 25 is configured for measuring a concentration of an industrial process fluid concentrate in the industrial process fluid.

The fluid treatment system 100 comprises furthermore a second fluid path arrangement 31 which is provided in connection with an inlet 25*a* of the sensor device 25, wherein said second fluid path arrangement 31 comprises a third fluid connector 3*c* configured to be connected to an industrial process fluid concentrate tank 22. The second fluid path arrangement 31 comprises also in some embodiments a valve, here called a concentrate valve 27*a*. Hereby the fluid treatment system 100 can be connected to an industrial process fluid concentrate tank 22 and industrial process fluid concentrate can be provided via the fluid treatment system 100 to the system 8. This description of the second fluid path arrangement 31 is also common for most embodiments and will not be repeated again for all the embodiments.

In this embodiment of the invention, but not in all embodiments, the second fluid path arrangement 31 further comprises a concentrate pump 24. The first fluid path arrangement 21 comprises furthermore in this embodiment but not in all embodiments, a valve 27'. By controlling the concentrate valve 27*a*, the valve 27', the first pump 23 and the concentrate pump 24 in the fluid treatment system 100 the addition of industrial process fluid concentrate from the industrial process fluid concentrate tank 22 can be controlled. This addition should be based on a concentration measurement by the sensor device 25 as discussed above. In some embodiments of the invention the fluid treatment system 100 further comprises a control system 60. In FIG. 1*a* a control system 60 is shown connected to the sensor device 25, the first pump 23, the concentrate pump 24, the concentrate valve 27*a* and the valve 27'. Control systems can be provided in all the other embodiments but is only shown in the embodiments of FIGS. 1*a*, 1*b* and 4*a*. Controllable components, such as for example the sensor device 25, the pumps and the valves of the fluid treatment system can be connected to such a control system 60, whereby the control system is configured to control the fluid treatment system to add an amount of industrial process fluid concentrate via the second fluid path arrangement 21*b* and via the sensor device 25 to the system 8 in order to maintain a predefined concentration level, wherein said amount is calculated based on the concentration measured in the sensor device 25. The control system 60 can be configured to control the fluid treatment system 100; 100'; 200; 200'; 300; 300'; 400; 400'; 500; 500'; 600;600'; 700;700' for cleaning the sensor device 25 at certain time intervals by letting industrial process fluid concentrate pass into the sensor device 25 and keeping the industrial process fluid concentrate in the sensor device 25 for a certain time period.

Figure 1B:
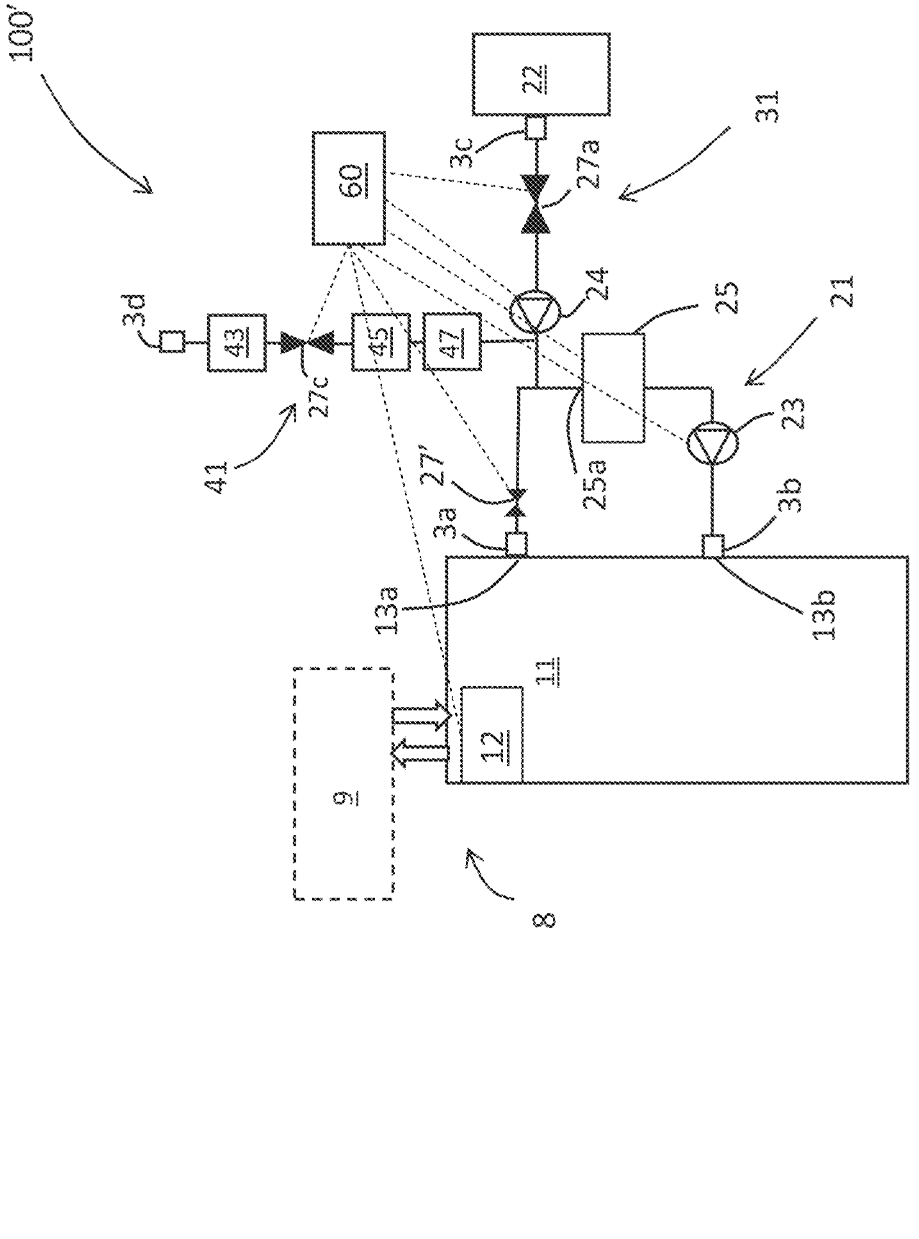

FIG. 1*b* shows schematically a fluid treatment system 100' which is almost identical with the fluid treatment system 100 of FIG. 1*a*. The difference is that in the fluid treatment system 100' of FIG. 1*b* the fluid treatment system 100' further comprises a third fluid path arrangement 41 which is provided in connection with an inlet 25*a* of the sensor device 25. The third fluid path arrangement 41 comprises a fourth fluid connector 3*d* configured to be connected to a water supply, whereby an addition of water can be provided via the sensor device 25. The water supply is normally pressurized so no extra pump is hereby needed. The third fluid path arrangement 41 comprises also a water valve 27*c*. Hereby water addition can be controlled by controlling said water valve 27*c*. A control system 60 is also in this embodiment shown to be connected to the first pump 23, the concentrate pump 24, the concentrate valve 27*a*, the valve 27' and the water valve 27*c* and to the sensor device 25 and hereby both industrial process fluid concentrate addition and water addition can be controlled by the control system 60. A level sensor 12 may also be provided in the industrial process fluid tank 11 and this level sensor 12 may possibly also be connected to the control system 60 such that a water addition can be properly controlled based on a read out from the level sensor.

The third fluid path arrangement 41 comprises suitably, but not necessarily some more components. One or more of the components described in this passage may be provided in a third fluid path arrangement 41 according to the invention. A dirt filter 43 for filtering other possible content than water from the water supply may be provided. A constant flow valve 45 which will assure a certain flow of water into the fluid treatment system 100' may be provided and a non return valve 47 which will ensure that no fluid is flowing out from the fluid treatment system 100' via the third fluid path arrangement 41 may be provided. These parts of the third fluid path arrangement 41 are the same for all the embodiments which include the third fluid path arrangement 41 and will not be described in detail again.

As partly already described above there are many advantages with a fluid treatment system according to the invention. By moving the sensor device 25 outside the system the sensor device will not be fouled and contaminated by the industrial process fluid as fast as if it was positioned all the time in the industrial process fluid inside for example the industrial process fluid tank 11 of the system 8. Furthermore, by adding new industrial process fluid concentrate into the system 8 via the sensor device, the sensor device 25 can be cleaned regularly in an easy way. Even further the sensor device itself can be used as an indicator if the industrial process fluid concentrate tank 22 is empty of industrial process fluid concentrate. In some embodiments of the invention also water can be added via the sensor device 25 which is suitable because then the sensor device 25 can also easily be calibrated by use of the water and the sensor device can be stored in water as described above.

Figure 2A:
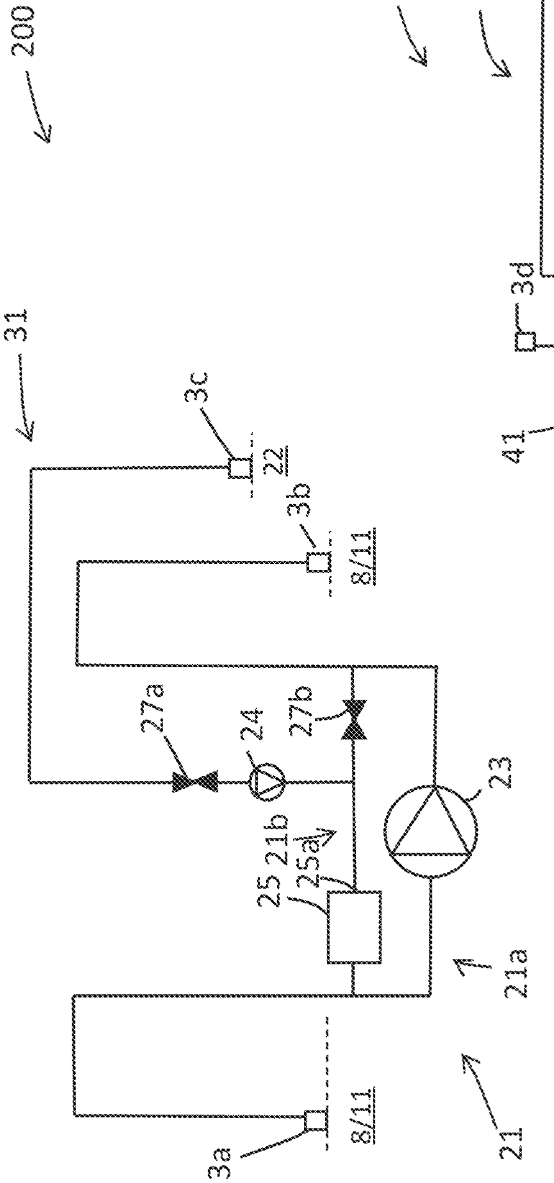
FIGS. 2*a* and 2*b* show schematically two different variations of a fluid treatment system according to one embodiment of the invention.

FIG. 2*a* shows schematically another embodiment of a fluid treatment system 200 according to the invention. The system 8 (possibly comprising an industrial process fluid tank 11) and the industrial process fluid concentrate tank 22 are not shown more than by numbers to which the first, second and third fluid connectors 3*a*, 3*b*, and 3*c* can be connected to. This will be the same in the rest of the FIGS. 3-7. The system 8 and the tanks 11 and 22 are only shown in FIGS. 1*a* and 1*b*. In this embodiment of the invention the first fluid path arrangement 21 comprises a main fluid path 21*a* and a return loop fluid path 21*b*. The main fluid path 21*a* comprises the first pump 23 and the return loop fluid path 21*b* comprises the sensor device 25. The return loop fluid path 21*b* is connected to the main fluid path 21*a* such that a part of the fluid flow in the main fluid path 21*a* can be returned over the first pump 23 via the return loop fluid path 21*b*. A fluid flow through said return loop fluid path 21*b* is driven by a differential pressure over the first pump 23. The return loop fluid path 21*b* further comprises a return loop valve 27*b*. Hereby, by use of only the first pump 23, a smaller part of the fluid flow which is transferred through the main fluid path 21*a* can be redirected to flow through the return loop fluid path 21*b* and hereby pass the sensor device 25. By closing and opening the return loop valve 27*b* (suitably controlled by a connected control system 60) a flow of industrial process fluid through the sensor device 25 can be controlled to be performed only occasionally when the concentration of industrial process fluid concentrate needs to be measured. Hereby the sensor device 25 will not be affected by the industrial process fluid as much as if it were exposed to the industrial process fluid more often or all the time as discussed above. Hereby the sensor device will have a long lifetime and perform reliable measurements. The first pump 23 and the main fluid path 21*a* can hereby be used for larger flows of industrial process fluid and thus be used for mixing of the industrial process fluid in the system 8, possibly mixing in the industrial process fluid tank 11. According to this invention, the industrial process fluid concentrate is also added via the fluid treatment system 200 and hereby a larger flow of industrial process fluid through the main fluid path 21*a* is also advantageous for the inmixing of industrial process fluid concentrate in the industrial process fluid. The fluid treatment system 200 comprises a second fluid path arrangement 31 which is provided in connection with an inlet 25*a* of the sensor device 25 in the same way as already described above in relation to the embodiment shown in FIG. 1*a*. The second fluid path arrangement 31 comprises also in this embodiment a concentrate pump 24. A control system is not shown but suitably the pumps, valves and sensor device are connected to a control system also in this embodiment and in all other embodiments such that the pumps and valves can be controlled based on for example predefined settings and a read out from the sensor device.

In the fluid treatment system 200 according to this embodiment a fluid flow can be pumped through the main fluid path 21*a* by the first pump 23 while both the concentrate valve 27*a* and the return loop valve 27*b* are closed. When a concentration of industrial process fluid concentrate should be measured by the sensor device 25 the return loop valve 27*b* is opened. When the return loop valve 27*b* is open a part of the fluid flown through the main fluid path 21*a* will be transferred via the return loop fluid path 21*b*. The fluid flow through said return loop fluid path 21*b* is driven by a differential pressure over the first pump 23. If the measured concentration indicates a low level it may be necessary to add industrial process fluid concentrate from the industrial process fluid concentrate tank 22 whereby the concentrate valve 27*a* is opened and the concentrate pump 24 is turned on. The return loop valve 27*b* may at the same time be closed but it can also be kept open. Hereby industrial process fluid concentrate is pumped via the second fluid path arrangement 31 from the industrial process fluid concentrate tank 22 to the inlet 25*a* of the sensor device 25. The industrial process fluid concentrate is transferred through the sensor device 25 and will be mixed with the industrial process fluid flow in the main fluid path 21*a* of the first fluid path arrangement 21 and in the first pump 23 and be pumped through the first fluid path arrangement 21 and further transferred to the second fluid connection 3*b* and further into the system 8. The mixing in the first pump 23 with the industrial process fluid in the main fluid path 21*a* will be very efficient which is suitable. Without a good inmixing of an industrial process fluid concentrate in an industrial process fluid it is a risk that the industrial process fluid concentrate will sink to a bottom and not be properly utilised. A flow through the main fluid path 21*a* can be relatively large and can also be provided relatively often or all the time or almost all the time independently of the measuring of concentration in the sensor device and the addition of industrial process fluid concentrate. Hereby the fluid treatment device according to the invention can be effectively used for mixing of an industrial process fluid in a system 8, such as mixing of an industrial process fluid in an industrial process fluid tank 11 of a system 8. During cleaning of the sensor device 25 the return loop valve 27*b* is closed and industrial process fluid concentrate can be kept inside the sensor device 25 and thereby clean the sensor device 25. Hereby the pumps, valves and the sensor device can be controlled to both mix the industrial process fluid in the system 8, measuring the concentration of industrial process fluid concentrate in the industrial process fluid, addition of industrial process fluid concentrate and cleaning of the sensor device.

Figure 2B:
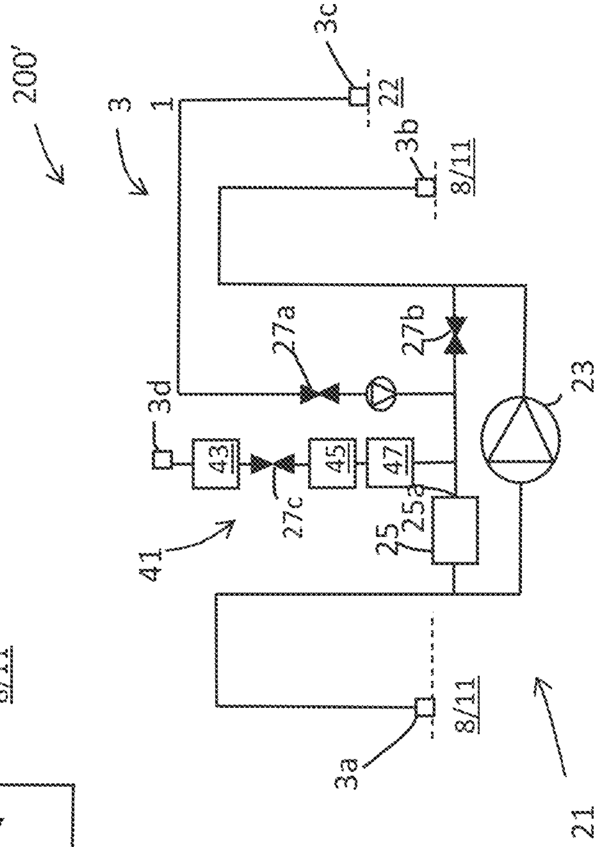

In FIG. 2*b* the same embodiment as described in relation to FIG. 2*a* is shown with the only addition that the fluid treatment system 200' further comprises a third fluid path arrangement 41 which is provided in connection with an inlet 25*a* of the sensor device 25. The details of the third fluid path arrangement 41 and the functions and advantages are the same as already described in relation to FIG. 1*b* and will not be described again. In summary also water can be added to the industrial process fluid in the system 8 via the fluid treatment system 200' and because the water is added via the sensor device 25 the sensor device can easily be calibrated by use of the water. The sensor device 25 can also be stored in water between uses.

Figure 3A:
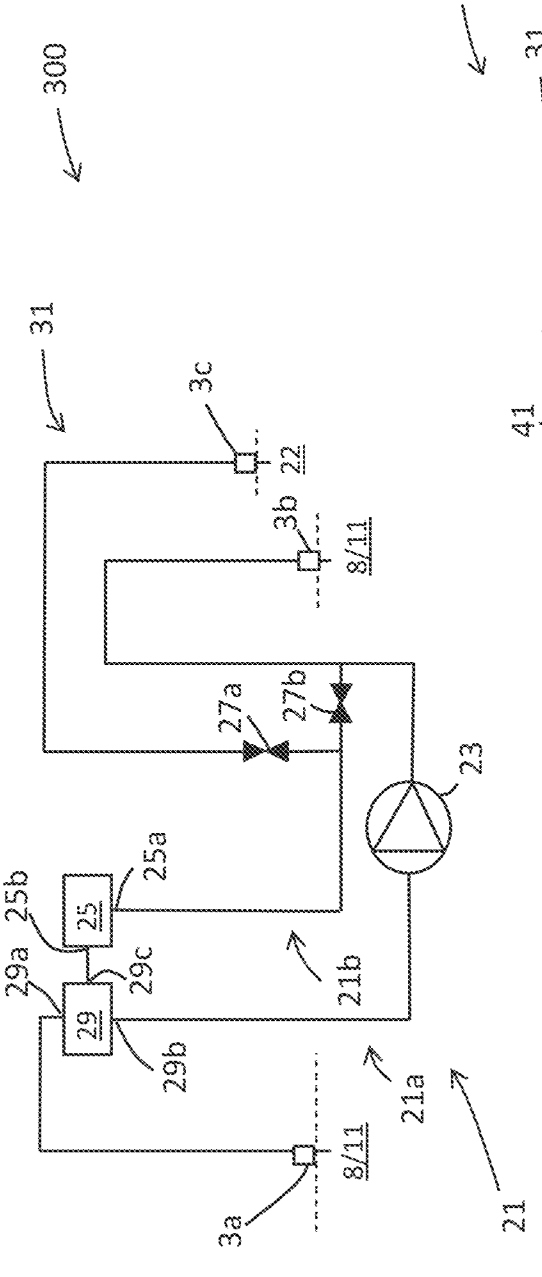
FIGS. 3*a* and 3*b* show schematically two different variations of a fluid treatment system according to one embodiment of the invention.
Figure 3B:
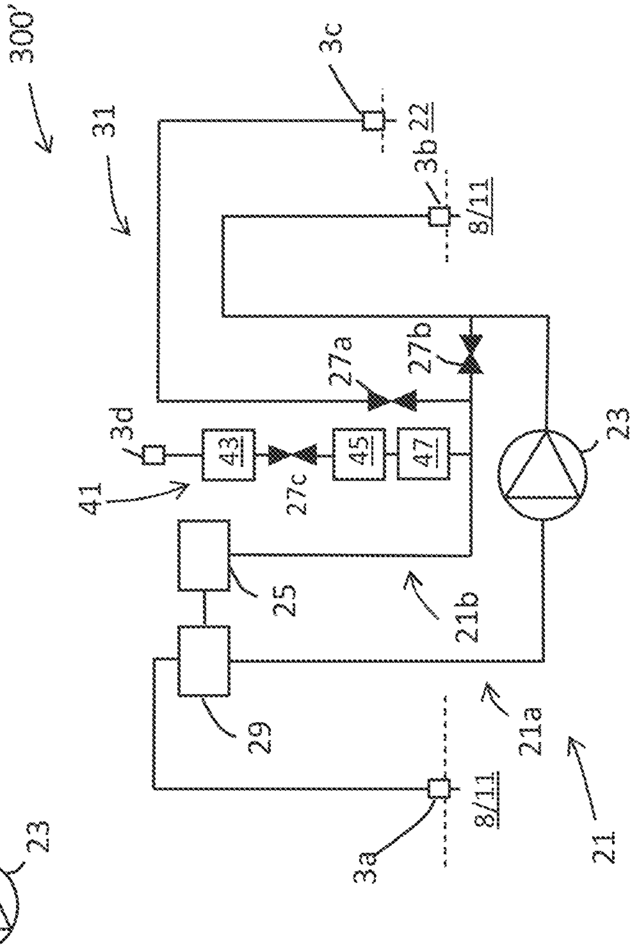

FIG. 3*a* shows schematically another embodiment of a fluid treatment system 300 according to the invention. FIG. 3*b* shows the same embodiment as in FIG. 3*a* but with the addition of a third fluid path arrangement 41 similar to previous embodiments. Many of the details are the same as already described for the embodiment shown in FIGS. 2*a* and 2*b*. Also in this embodiment the first fluid path arrangement 21 comprises a main fluid path 21*a* and a return loop fluid path 21*b*. The difference compared to the embodiment in FIGS. 2*a* and 2*b* is that in this embodiment no concentrate pump 24 is needed in the second fluid path arrangement 31. This is suitable because industrial process fluid concentrate is very viscous and difficult to pump. In this embodiment an ejector pump 29 is instead provided in the main fluid path 21*a*. The ejector pump 29 comprises a main inlet 29*a*, an outlet 29*b* and a suction inlet 29*c*. The main inlet 29*a* and the outlet 29*c* are connected in the main fluid path 21*a* such that the main inlet 29*a* is connected to the first fluid connection 3*a* and the outlet 29*b* is connected to the first pump 23. The suction inlet 29*c* of the ejector pump 29 is connected to an outlet 25*b* of the sensor device 25 which is provided in the return loop fluid path 21*b*. The ejector pump 29 is hereby driven by the first pump 23 and is connected with the suction inlet 29*c* of the ejector pump 29 to the outlet 25*b* of the sensor device 25, whereby industrial process fluid from a connected system 8 (or a connected industrial process fluid tank 11 of a system 8) and industrial process fluid concentrate from a connected industrial process fluid concentrate tank 22 can be sucked through the sensor device 25 by the ejector pump 29. Industrial process fluid from the system 8 will be sucked through the sensor device 25 by the ejector pump 29 when the return loop valve 27*b* is open and industrial process fluid concentrate from the industrial process fluid concentrate tank 22 will be sucked through the sensor device 25 by the ejector pump 29 when the concentrate valve 27*a* is open (while the return loop valve 27*b* at the same time is closed).

In the embodiment shown in FIG. 3*b*, where also water can be added via the third fluid path arrangement 41, water can be added even if the first pump 23 is turned off thanks to the normally pressurized water supply. However, the first pump 23 may be pumping all the time or almost all the time for performing mixing.

Figure 4A:
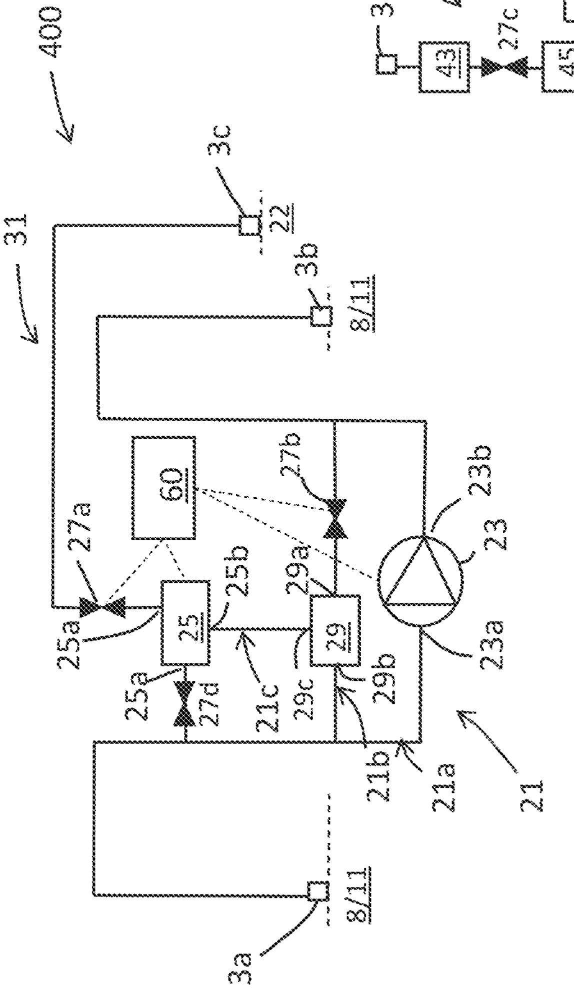
FIGS. 4*a* and 4*b* show schematically two different variations of a fluid treatment system according to one embodiment of the invention.
Figure 4B:
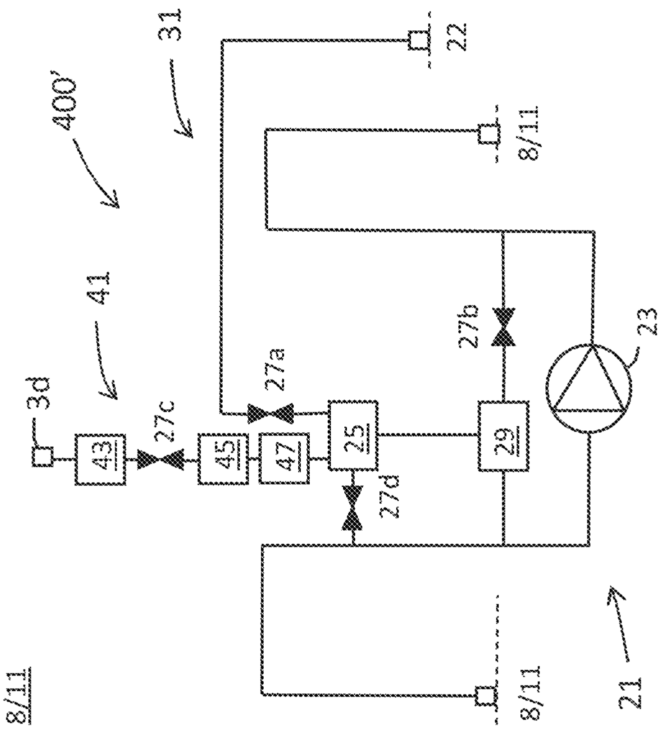

FIG. 4*a* shows schematically another embodiment of a fluid treatment system 400 according to the invention. FIG. 4*b* shows the same embodiment as in FIG. 4*a* but with the addition of a third fluid path arrangement 41 similar to previous embodiments. In this embodiment the first fluid path arrangement 21 of the fluid treatment system 400; 400' comprises a main fluid path 21*a*, a return loop fluid path 21*b* and also a separate sensor device fluid path 21*c* which comprises the sensor device 25. The main fluid path 21*a* comprises the first pump 23. The return loop fluid path 21*b* comprises a return loop valve 27*b* as in previous embodiments but also an ejector pump 29. The ejector pump 29 comprises as described above a main inlet 29*a* which is connected to an outlet side 23*b* of the first pump 23 and an outlet 29*b* which is connected to an inlet side 23*a* of the first pump 23. Hereby a fluid flow will be driven through the ejector pump 29 by a differential pressure provided over the first pump 23 when pumping. Furthermore, a suction inlet 29*c* of the ejector pump 29 is connected to an outlet 25*b* of the sensor device 25 which is provided in the separate sensor device fluid path 21*c*. In this embodiment an inlet 25*a* of the sensor device 25 should be connected to both the main fluid path 21*a* via a sensor device fluid path valve 27*d* and to the second fluid path arrangement 31 as in previous embodiments. In FIG. 4*a* two separate inlets to the sensor device 25 are shown but they can be combined into one as well. In the embodiment shown in FIG. 4*b* the third fluid path arrangement 41 is also connected to an inlet 25*a* of the sensor device 25. Hereby, in the embodiments as shown in FIGS. 4*a* and 4*b*, industrial process fluid can be drawn through the sensor device 25 by the ejector 29 when the sensor device fluid path valve 27*d* is open and hereby a concentration of an industrial process fluid concentrate in the industrial process fluid can be measured in the sensor device 25. If the concentrate valve 27*a* instead is opened industrial process fluid concentrate can be sucked through the sensor device by the ejector pump 29. The return loop valve 27*b* needs to be open for both these actions. If only mixing of the industrial process fluid in the system 8 is wanted all the valves 27*a,b,c,d* can be closed and the first pump 23 can be pumping industrial process fluid through only the main fluid path 21*a* of the first fluid path arrangement 21.

When industrial process fluid concentrate is added in this embodiment of the invention a very good mixing of the concentrate into the industrial process fluid is provided because it is first mixed in the ejector pump 29 and then also in the first pump 23. Another advantage with this embodiment is that a possible leakage in for example the return loop valve 27*b* and/or the sensor device fluid path valve 27*d* is not very critical. This is because the ejector 29 will not work and suck a fluid from the sensor device 25 until a certain flow is provided through the ejector 29. If there is only a small leakage in the return loop valve 27*b* the suction inlet 29*c* of the ejector will not be sucking. This is suitable because for example when an industrial process fluid concentrate should be kept in the sensor device 25 for cleaning the sensor device a leakage would be negative. The ejector 29 will act as a barrier between the sensor device 25 and the rest of the fluid treatment system (i.e., the mixing performed in the main fluid path 21*a* and in the first pump 23). In these embodiments of the invention the sensitive parts of the system, such as the sensor device 25 and to some extent the valves 27*a,b,c,d*, will be kept outside the main flow of industrial process fluid which is provided in the main fluid path 21*a*. The sensitive parts will only be exposed to the industrial process fluid during short periods, i.e., only when needed. Hereby a lifetime of the sensitive components will be prolonged.

FIGS. 5*a*, 5*b*, 6, 7, 8*a* and 8*b* show schematically fluid treatment systems 500; 500'; 600; 700; 800; 800' according to different embodiments of the invention comprising a UV reactor 61. The UV reactor comprises a UV lamp and is connected in the first fluid path arrangement 21 of the fluid treatment system 500; 500' 600; 700; 800; 800' such that the first pump 23 can pump a flow of industrial process fluid through the UV reactor 61 for treatment. The industrial process fluid is irradiated by UV light when passing through the UV reactor 61 and hereby bacteria are destroyed which is suitable when treating industrial process fluids for further use. After passing the UV reactor the treated industrial process fluid is transferred to the second fluid connector 3*b* for delivering it back to the industrial process fluid in the system 8. The UV reactor 61 comprises hereby a reactor inlet 61*a* which is connected to an outlet 23*b* of the first pump 23 and a reactor outlet 61*b* which is connected to the second fluid connector 3*b*. In some embodiments the UV lamp is provided as an elongated lamp and an elongated annular reactor compartment is provided around the UV lamp where the industrial process fluid can flow. Hereby the industrial process fluid can come in relatively close contact with the UV lamp and an effective UV treatment is achieved. The reactor inlet 61*a* is provided in one end of the elongated reactor compartment and the reactor outlet 61*b* is provided in the opposite end of the elongated reactor compartment.

Figure 5A:
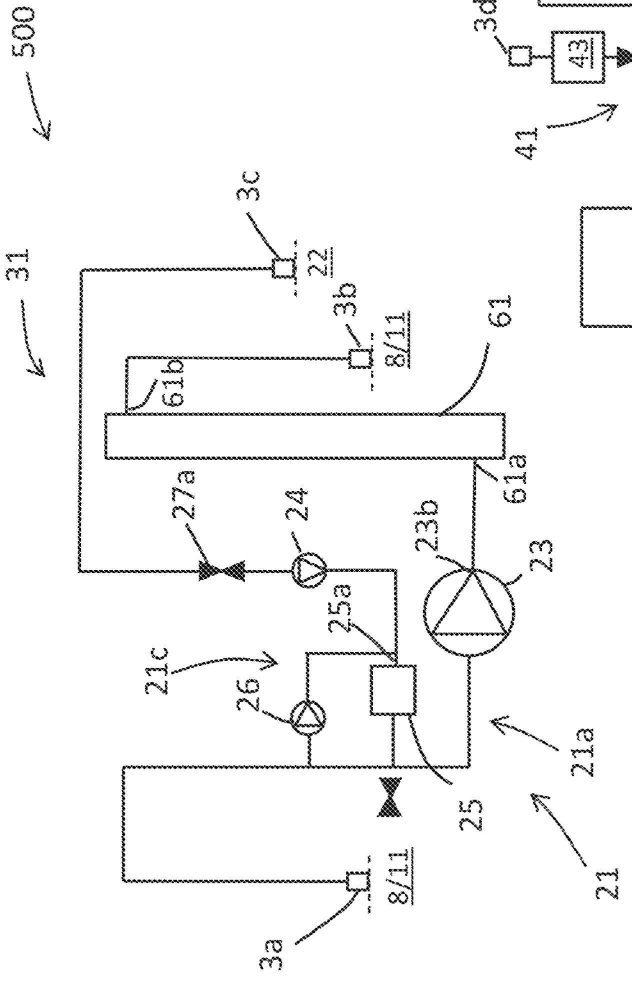
FIGS. 5*a* and 5*b* show schematically two different variations of a fluid treatment system comprising a UV reactor according to one embodiment of the invention.

The fluid treatment system 500 as shown in FIG. 5*a* comprises a first fluid path arrangement 21 which comprises the first pump 23 and a separate sensor device fluid path 21*c* but no return loop fluid path 21*b* as in many of the previous described embodiments.

The sensor device 25 is in this embodiment connected in a separate sensor device fluid path 21*c* together with a separate sensor device pump 26.

The sensor device pump 26 can pump a part of the fluid flow from the main fluid path 21*a* into the separate sensor device fluid path 21*c*. A second fluid path arrangement 31 is connected to an inlet of the sensor device 25*a* in the same way as described above in relation to for example FIG. 1*a*. A separate concentrate pump 24 is needed in this embodiment of the invention.

Figure 5B:
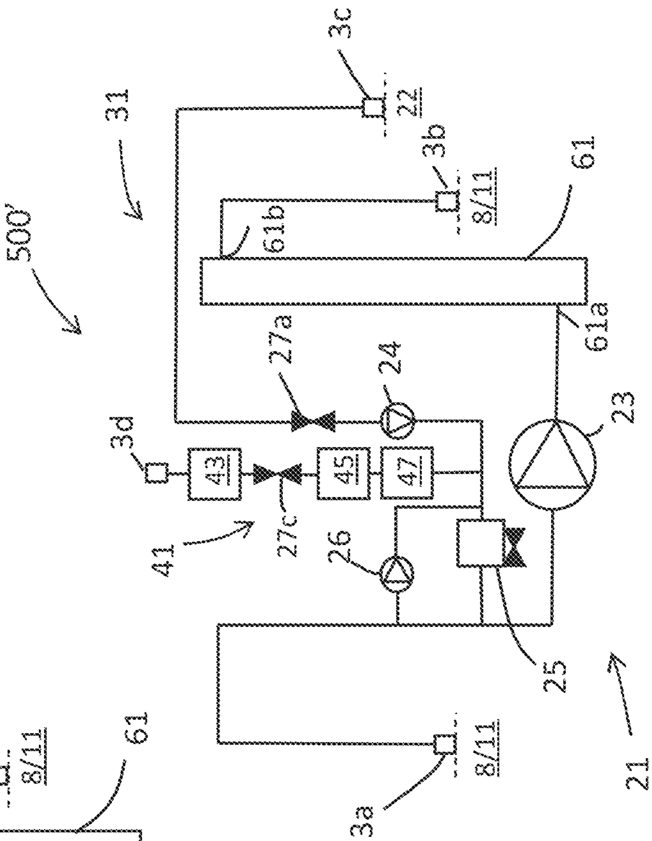

The fluid treatment system 500' as shown in FIG. 5*b* is identical to the fluid treatment system 500 in FIG. 5*a* but with an added third fluid path arrangement 41 connected to an inlet 25*a* of the sensor device 25. The third fluid path arrangement 41 is similar as described for previous embodiments and will not be described again. In the embodiments as shown in FIGS. 5*a* and 5*b* the fluid treatment system 500, 500' can be used for UV treatment of the industrial process fluid as described above. The first pump 23 can be used for pumping industrial process fluid from a connected system 8 through the UV reactor 61 for UV irradiation of the industrial process fluid. The fluid treatment system 500; 500' can also be used for measuring a concentration of industrial process fluid concentrate in the sensor device 25. The sensor device pump 26 is in this embodiment used for pumping industrial process fluid into the sensor device 25. Even further an industrial process fluid concentrate from an industrial process fluid concentrate tank 22 can be added to the industrial process fluid in the system 8 via the fluid treatment system 500; 500'. The concentrate pump 24 is used to pump industrial process fluid concentrate into the sensor device 25. After having passed the sensor device 25 the industrial process fluid concentrate will be received in the main fluid path 21*a* and will be mixed with the industrial process fluid in the first pump 23. Furthermore, the sensor device 25 can be cleaned by the industrial process fluid concentrate as described above in relation to previous embodiments and water added via the third fluid path arrangement 41 can be used for calibration and storing as described in relation to previously described embodiments.

Figure 6:
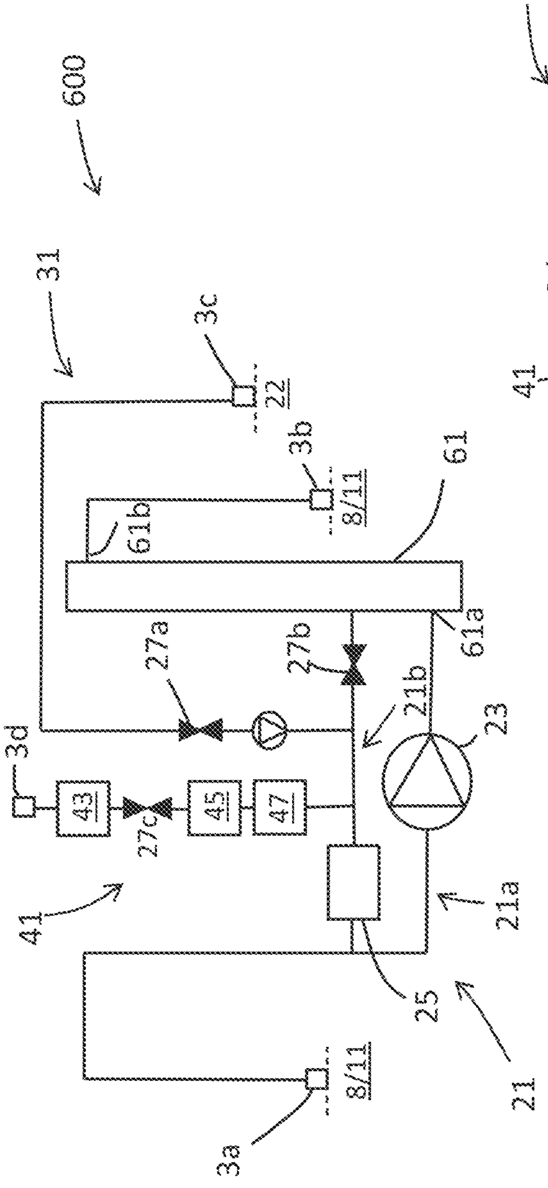
FIG. 6 shows schematically a fluid treatment system comprising a UV reactor according to one embodiment of the invention.
Figure 7:
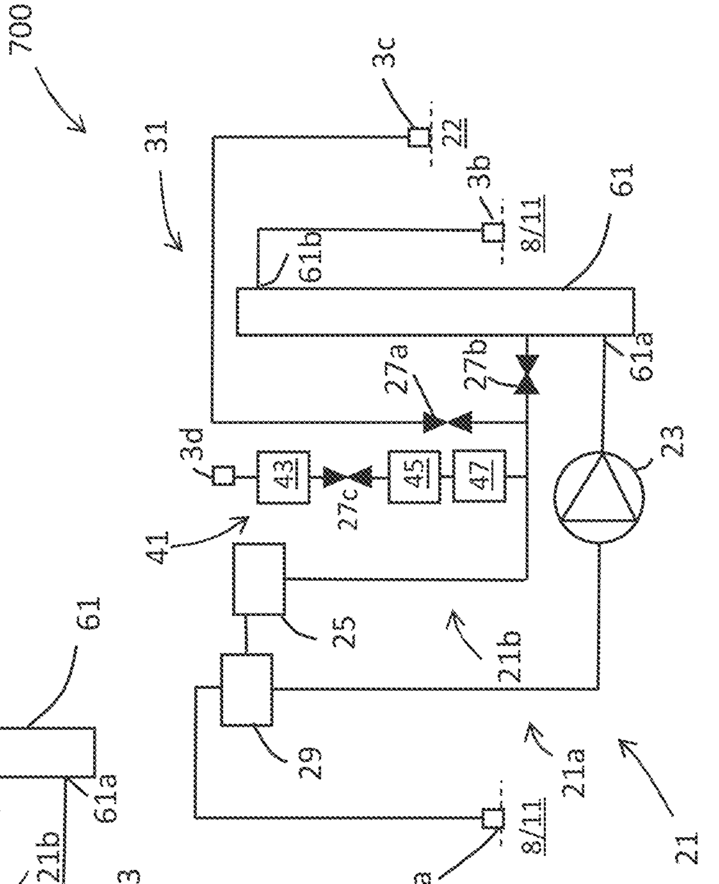
FIG. 7 shows schematically a fluid treatment system comprising a UV reactor according to one embodiment of the invention.

The embodiment shown in FIG. 6 corresponds exactly to the embodiment shown in FIG. 2*b* but with the addition of the UV reactor 61 and the embodiment shown in FIG. 7 corresponds exactly to the embodiment shown in FIG. 3*b* but with the addition of the UV reactor 61. These embodiments will not be further described. Both these two embodiments can obviously also be provided without the third fluid path arrangement 41 if no water needs to be added via the fluid treatment systems 600; 700.

Figure 8A:
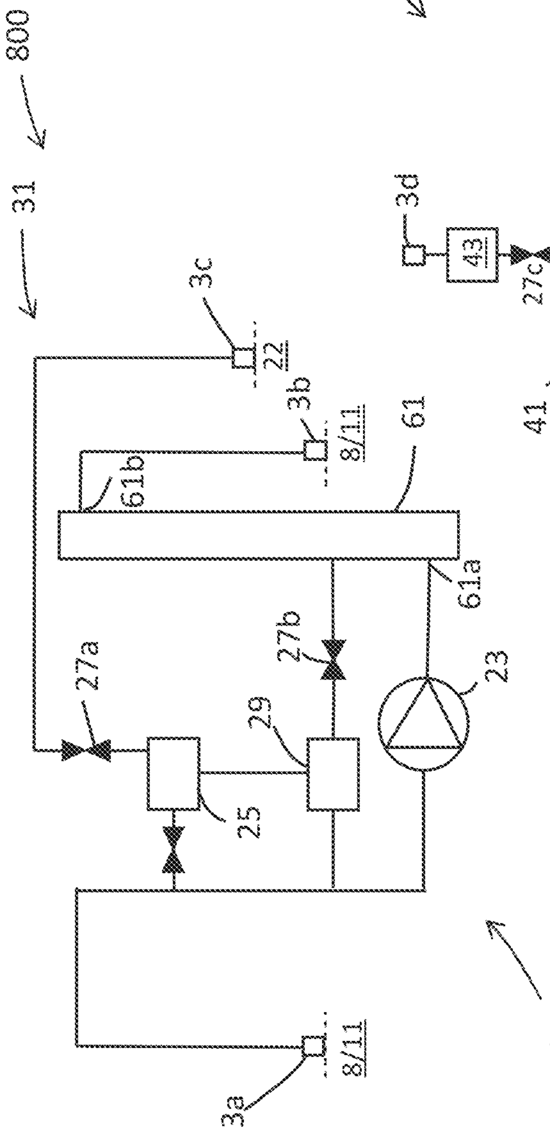
FIGS. 8*a* and 8*b* show schematically two different variations of a fluid treatment system comprising a UV reactor according to one embodiment of the invention.
Figure 8B:
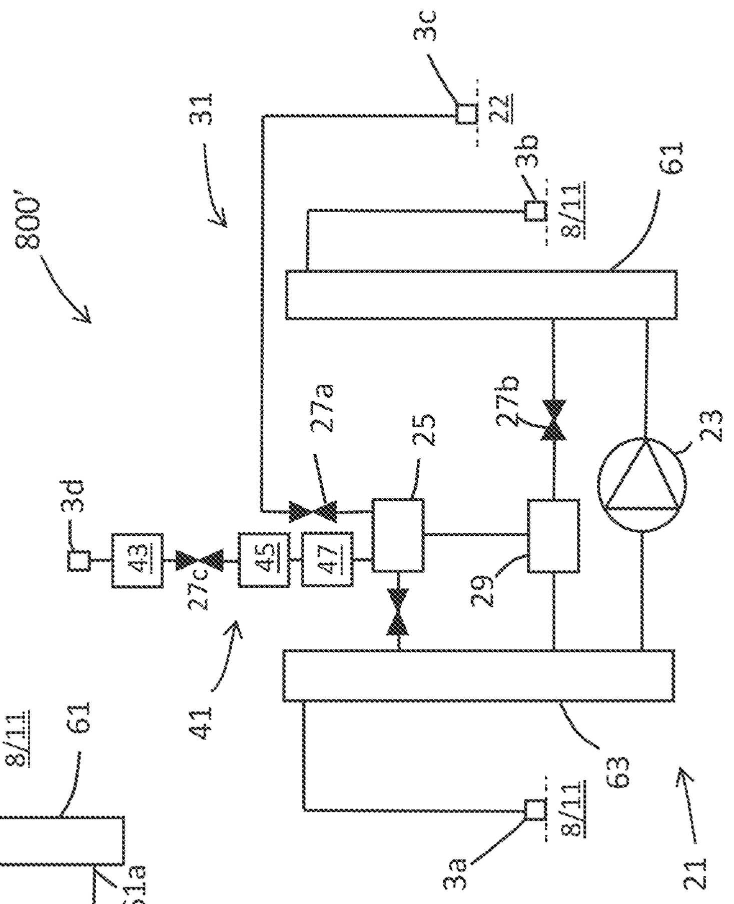
Figure 9:
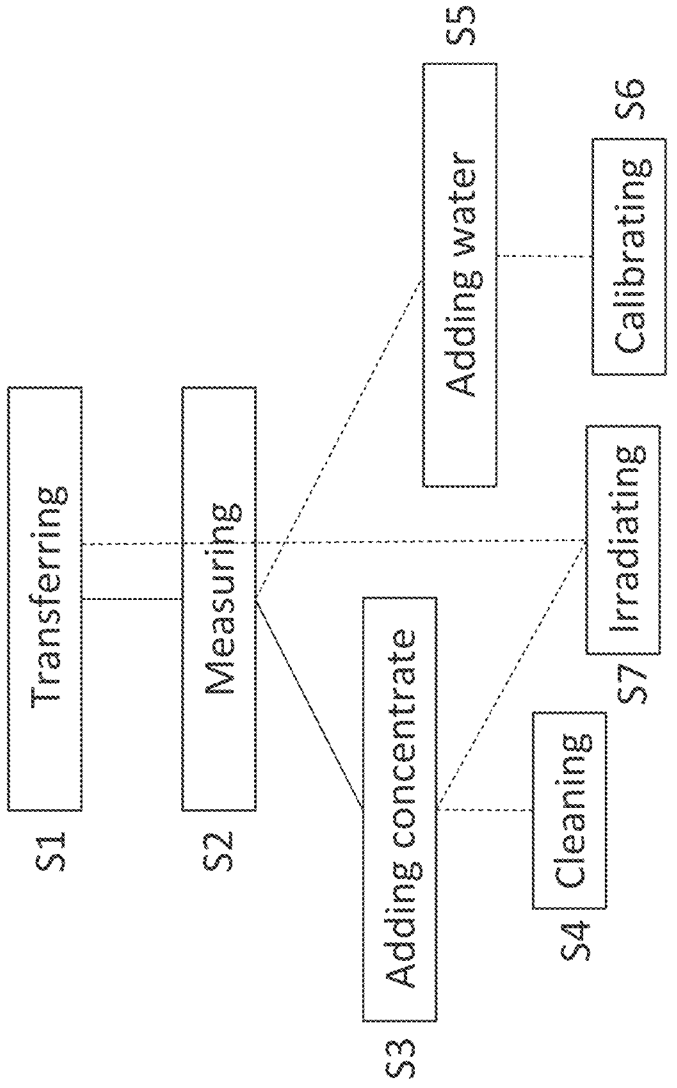
FIG. 9 is a flow chart of a method according to one embodiment of the invention.

FIG. 8*a* shows schematically another embodiment of a fluid treatment system 800 according to the invention including an UV reactor 61. FIG. 8*b* shows the same embodiment as in FIG. 8*a* but with the addition of a third fluid path arrangement 41 similar to previous embodiments and further with an added priming tank 63. A priming tank 63 may be suitable for avoiding problems with air into the pumps when starting the fluid treatment system 800'. A priming tank 63 can be provided in all the previous embodiments. The embodiments shown in FIGS. 8*a* and 8*b* correspond exactly to the embodiments shown in FIGS. 4*a* and 4*b* but with the addition of the UV reactor 61 and the priming tank 63 in FIG. 8*b*. Hereby no further description is needed.

By combining the addition of industrial process fluid concentrate with UV treatment of industrial process fluid some important synergies are achieved. By mixing the industrial process fluid concentrate into the industrial process fluid via the first pump 23 the inmixing of the concentrate in the industrial process fluid will be effective. Furthermore, a UV treatment of the industrial process fluid will be more effective if there is a correct concentration of industrial process fluid concentrate in the industrial process fluid. Still further, in many of the embodiments the effect from the first pump 23 which is primarily used for the UV treatment is also used for pumping the industrial process fluid concentrate from the industrial process fluid concentrate tank 22 and for pumping a smaller part of the industrial process fluid flow through a sensor device for measuring the concentration. Hereby a very effective and robust system is achieved. The advantages related to cleaning and calibration of the sensor device have been discussed above. A fluid treatment system according to the invention provides for a very effective and convenient treatment of industrial process fluids.

The invention claimed is:

1. A method for treating an industrial process fluid used in a system, said method comprising:

transferring a part of the industrial process fluid used in the system through a first fluid path arrangement of a fluid treatment system which is connected to an outlet of the system and an inlet of the system;

measuring a concentration of an industrial process fluid concentrate in the industrial process fluid by a sensor device provided in the first fluid path arrangement of the fluid treatment system; and adding an amount of the industrial process fluid concentrate to the industrial process fluid used in the system in order to maintain a predefined concentration level of the industrial process fluid concentrate in the industrial process fluid used in the system, wherein said amount is calculated based on the measured concentration, whereby the industrial process fluid concentrate is provided into the system via the sensor device in the fluid treatment system, wherein the adding of the amount of the industrial process fluid concentrate to the industrial process fluid used in the system includes, at certain time intervals, providing at least a portion of the amount of the industrial process fluid concentrate into the sensor device and keeping at least the portion of the amount of the industrial process fluid concentrate in the sensor device for a certain time period to clean the sensor device.

2. The method according to claim 1, wherein the transferring of the part of the industrial process fluid provided in the system through the first fluid path arrangement of the fluid treatment system comprises dividing a flow of the industrial process fluid when passing through the first fluid path arrangement of the fluid treatment system into at least a main fluid path and a return loop fluid path, wherein said main fluid path comprises a first pump and said return loop fluid path either comprises the sensor device or is connected to a separate sensor device fluid path of the first fluid path arrangement, wherein said separate sensor device fluid path comprises the sensor device, wherein said return loop fluid path is connected to the main fluid path such that a part of a fluid flow in the main fluid path can be returned over the first pump via the return loop fluid path and wherein a fluid flow through said return loop fluid path is driven by a differential pressure over the first pump.

3. The method according to claim 2, wherein the measuring of the concentration of the industrial process fluid concentrate in the industrial process fluid and the adding of the amount of the industrial process fluid concentrate to the industrial process fluid used in the system comprises sucking the industrial process fluid and the industrial process fluid concentrate respectively through the sensor device by an ejector pump which is driven by the first pump in the main fluid path and connected to an outlet of the sensor device.

4. The method according to claim 1, further comprising adding water to the industrial process fluid in the system, whereby the adding of the water is provided via the sensor device.

5. The method according to claim 4, further comprising calibrating the sensor device at certain calibration time intervals by use of the water passing the sensor device on its way into the system.

6. The method according to claim 4, further comprising registering an outage in water supply and/or industrial process fluid concentrate supply by comparing values measured by the sensor device.

7. The method according to claim 1, further comprising mixing the industrial process fluid used in the system by pumping the industrial process fluid via the fluid treatment system.

8. The method according to claim 1, further comprising:

irradiating the industrial process fluid by UV light in a UV reactor provided in the fluid treatment system, and pumping the industrial process fluid through the UV reactor by a first pump.

9. The method according to claim 1, wherein said industrial process fluid is a metal working fluid.

10. A fluid treatment system for treating an industrial process fluid used in a system to which the fluid treatment system can be connected, said fluid treatment system comprising:

a first fluid connector configured to be connected to an outlet provided in the system, said first fluid connector being configured for receiving the industrial process fluid into the fluid treatment system;

a second fluid connector configured to be connected to an inlet provided in the system for returning the industrial process fluid after treatment in the fluid treatment system;

a first fluid path arrangement which is fluidly connecting the first fluid connector and the second fluid connector, wherein said first fluid path arrangement includes, a first pump configured to pump the industrial process fluid from the first fluid connector to the second fluid connector, and a sensor device which is connected in the first fluid path arrangement such that it receives at least a part of the industrial process fluid pumped by the first pump, wherein said sensor device is configured for measuring a concentration of an industrial process fluid concentrate in the industrial process fluid; and a second fluid path arrangement which is provided in connection with an inlet of the sensor device, wherein said second fluid path arrangement includes, a third fluid connector configured to be connected to an industrial process fluid concentrate tank, whereby the fluid treatment system is configured to provide the industrial process fluid concentrate from the industrial process fluid concentrate tank via the second fluid path arrangement and via the sensor device in the first fluid path arrangement and further via the first fluid path arrangement to the second fluid connector for addition to the industrial process fluid used in the system, wherein said fluid treatment system further comprises a control system, whereby the control system is configured to control the fluid treatment system to add an amount of the industrial process fluid concentrate via the second fluid path arrangement and via the sensor device to the system in order to maintain a predefined concentration level of the industrial process fluid concentrate in the industrial process fluid used in the system, wherein said amount is calculated based on the concentration measured in the sensor device, wherein the adding of the amount of the industrial process fluid concentrate to the industrial process fluid used in the system includes controlling the fluid treatment system for cleaning the sensor device at certain time intervals to let at least a portion of the amount of the industrial process fluid concentrate pass into the sensor device and keep at least the portion of the amount of the industrial process fluid concentrate in the sensor device for a certain time period to clean the sensor device.

11. The fluid treatment system according to claim 10, wherein said sensor device comprises a refractometer.

12. The fluid treatment system according to claim 10, wherein the first fluid path arrangement comprises a main fluid path and a return loop fluid path, wherein said main fluid path comprises the first pump and said return loop fluid path either comprises the sensor device or is connected to a separate sensor device fluid path of the first fluid path arrangement, wherein said separate sensor device fluid path comprises the sensor device, wherein said return loop fluid path is connected to the main fluid path such that a part of a fluid flow in the main fluid path can be returned over the first pump via the return loop fluid path and wherein a fluid flow through said return loop fluid path is driven by a differential pressure over the first pump.

13. The fluid treatment system according to claim 12, wherein the second fluid path arrangement comprises a concentrate valve and the return loop fluid path comprises a return loop valve.

14. The fluid treatment system according to claim 12, wherein the first fluid path arrangement further comprises an ejector pump which is driven by the first pump and is connected with a suction inlet of the ejector pump to an outlet of the sensor device, whereby the industrial process fluid from the system and the industrial process fluid concentrate from the industrial process fluid concentrate tank can be sucked through the sensor device by the ejector pump.

15. The fluid treatment system according to claim 14, wherein a main inlet and an outlet of the ejector pump are connected in the return loop fluid path and the suction inlet of the ejector pump is connected to the outlet of the sensor device, wherein the sensor device further is connected to the main fluid path via a sensor device fluid path valve.

16. The fluid treatment system according to claim 14, wherein a main inlet and an outlet of the ejector pump are connected in the main fluid path and the suction inlet of the ejector pump is connected to the outlet of the sensor device which is provided in the return loop fluid path.

17. The fluid treatment system according to claim 10, further comprising a third fluid path arrangement which is provided in connection with the inlet of the sensor device, wherein said third fluid path arrangement comprises a fourth fluid connector configured to be connected to a water supply, whereby adding of water to the system can be provided via the sensor device in the fluid treatment system.

18. The fluid treatment system according to claim 10, further comprising a UV reactor connected in the first fluid path arrangement, whereby the industrial process fluid is pumped through the UV reactor by the first pump and then returned to the system via the first fluid path arrangement.

19. The fluid treatment system according to claim 10, wherein said industrial process fluid is a metal working fluid.

20. A system using an industrial process fluid, wherein said system comprises the fluid treatment system according to claim 10, wherein said fluid treatment system is connected to an outlet provided in the system and an inlet provided in the system.

* * * * *